(12) United States Patent
Geisner et al.

(10) Patent No.: US 8,856,691 B2
(45) Date of Patent: Oct. 7, 2014

(54) GESTURE TOOL

(75) Inventors: Kevin Geisner, Seattle, WA (US); Stephen Latta, Seattle, WA (US); Gregory N. Snook, Sammamish, WA (US); Relja Markovic, Seattle, WA (US); Arthur Charles Tomlin, Redmond, WA (US); Mark Mihelich, Redmond, WA (US); Kyungsuk David Lee, Seattle, WA (US); David Jason Christopher Horbach, Bothell, WA (US); Matthew Jon Puls, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 12/474,655

(22) Filed: May 29, 2009

(65) Prior Publication Data

US 2010/0306713 A1 Dec. 2, 2010

(51) Int. Cl.
G06F 3/033 (2013.01)
G06F 3/01 (2006.01)

(52) U.S. Cl.
CPC ...................................... G06F 3/017 (2013.01)
USPC ............................ 715/863; 715/866; 715/707

(58) Field of Classification Search
USPC .......................................... 715/863, 707, 866
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |

(Continued)

FOREIGN PATENT DOCUMENTS

| CN | 201254344 B | 6/2010 |
| EP | 0583061 A2 | 2/1994 |

(Continued)

OTHER PUBLICATIONS

Wacom, graphire 3 User's Manual for Windows & Macintosh (Mar. 7, 2003).*

(Continued)

*Primary Examiner* — Amy Ng
*Assistant Examiner* — Di Xiao
(74) *Attorney, Agent, or Firm* — Gregg Wisdom; Judy Yee; Micky Minhas

(57) ABSTRACT

Systems, methods and computer readable media are disclosed for a gesture tool. A capture device captures user movement and provides corresponding data to a gesture recognizer engine and an application. From that, the data is parsed to determine whether it satisfies one or more gesture filters, each filter corresponding to user-performed gesture. The data and the information about the filters is also sent to a gesture tool, which displays aspects of the data and filters. In response to user input corresponding to a change in a filter, the gesture tool sends an indication of such to the gesture recognizer engine and application, where that change occurs.

20 Claims, 13 Drawing Sheets

(56) References Cited

U.S. PATENT DOCUMENTS

| | | |
|---|---|---|
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 * | 7/2001 | Nguyen ............... 715/863 |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,638,175 B2 * | 10/2003 | Lee et al. ............... 473/223 |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,710 B1 | 3/2005 | Cohen-Solal |
| 6,873,723 B1 | 3/2005 | Aucsmith et al. |
| 6,876,496 B2 | 4/2005 | French et al. |
| 6,907,581 B2 | 6/2005 | Noy |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,046,232 B2 | 5/2006 | Inagaki |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,365,736 B2 | 4/2008 | Marvit |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |

(56) References Cited

U.S. PATENT DOCUMENTS

| | | | |
|---|---|---|---|
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0207597 A1 | 10/2004 | Marks | |
| 2005/0059488 A1 | 3/2005 | Larsen et al. | |
| 2005/0275638 A1 | 12/2005 | Kolmykov-Zotov | |
| 2006/0117067 A1 | 6/2006 | Wright | |
| 2006/0188144 A1 | 8/2006 | Sasaki et al. | |
| 2006/0239558 A1 | 10/2006 | Rafii et al. | |
| 2007/0013718 A1 | 1/2007 | Ohba | |
| 2007/0060336 A1 | 3/2007 | Marks et al. | |
| 2007/0098222 A1 | 5/2007 | Porter et al. | |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0026838 A1 | 1/2008 | Dunstan et al. | |
| 2008/0062257 A1 | 3/2008 | Corson | |
| 2008/0100620 A1 | 5/2008 | Nagai et al. | |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0214253 A1* | 9/2008 | Gillo et al. | 463/1 |
| 2008/0215679 A1* | 9/2008 | Gillo et al. | 709/204 |
| 2008/0215972 A1 | 9/2008 | Zalewski et al. | |
| 2008/0215973 A1 | 9/2008 | Zalewski et al. | |
| 2009/0141933 A1 | 6/2009 | Wagg | |
| 2009/0167679 A1 | 7/2009 | Klier et al. | |
| 2009/0183193 A1* | 7/2009 | Miller, IV | 725/10 |
| 2009/0217211 A1* | 8/2009 | Hildreth et al. | 715/863 |
| 2009/0221368 A1 | 9/2009 | Yen et al. | |
| 2009/0228841 A1* | 9/2009 | Hildreth | 715/863 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Bjorn Hartmann (hereinafter Hartmann), Formational Parameters and Adaptive Prototype Instantiation for MPEG-4 Compliant Gesture Synthesis (2002).*

Macnn, Review: Pro Click V1.6 High Precision Mouse (Sep. 28, 2006), http://www.macnn.com/reviews/pro-click-v1.6-high-precision-mouse.html.*

Razer, Krait high precision Gaming Mouse manual (2006).*

Ou et al., "Gestural Communication over Video Stream: Supporting Multimodal Interaction for Remote Collaborative Physical Tasks," http//www.cs.cmu.edu/~gestures/papers/p107-ou.pdf, ICMI'03, Nov. 5-7, 2003, pp. 1-8.

Kirk, D.S., "Turn it This Way: Remote Gesturing in Video-Mediated Communication," http://etheses.nottingham.ac.uk/292/1/DSK-PhDThesisComplete.pdf, Dec. 2006, pp. i-277.

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa FE, NM, Sep. 1-3, 2008, 260-267.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

(56) References Cited

OTHER PUBLICATIONS

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

\* cited by examiner

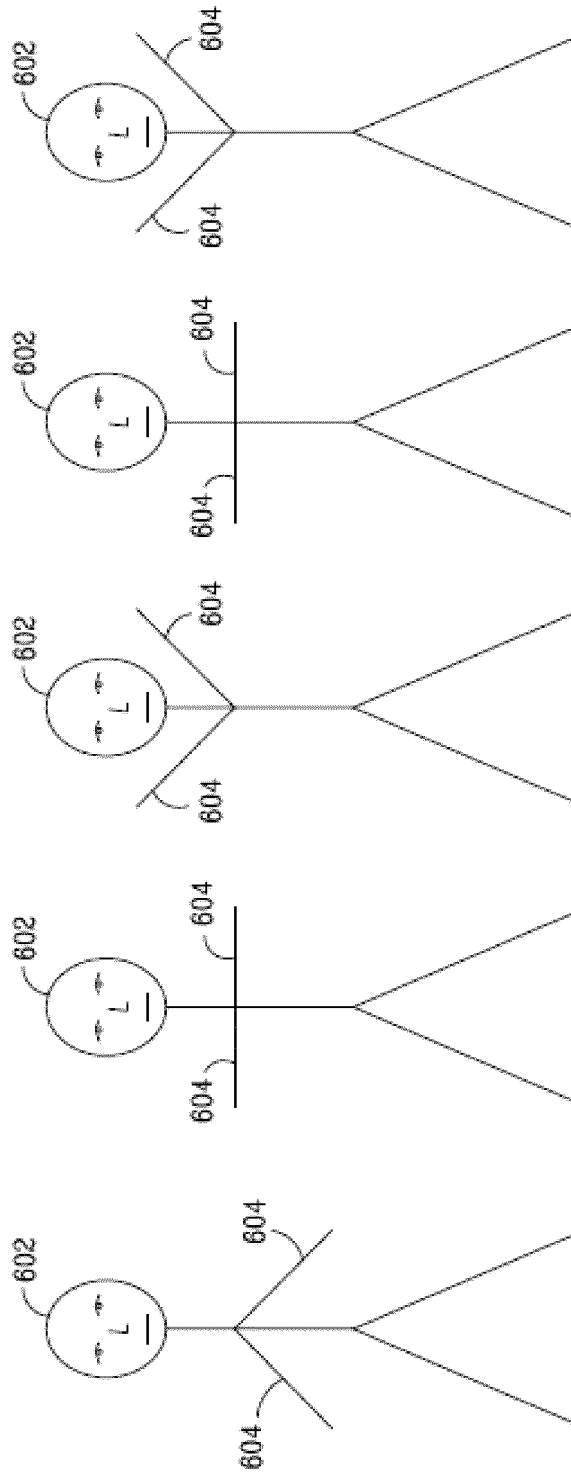

GESTURE TOOL

BACKGROUND OF THE INVENTION

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY OF THE INVENTION

Disclosed herein are systems and methods for a gesture tool. A gesture tool may be used by an application developer to visualize how user gesture input is being processed by a system, such as a gesture recognizer engine (described in detail below). Using those visualizations, the developer may modify how the system processes gesture output (such as by tuning one or more gesture filter parameters of a filter in the gesture recognizer engine) to increase the quality of user experience.

In an embodiment, a recognizer engine comprises a base recognizer engine and at least one filter. A filter comprises a information about a gesture and may comprise at least one corresponding parameter. The recognizer engine provides to an application a filter and receives from that application at least one parameter that specifies the particulars of how that gesture is to be recognized by the recognizer engine.

In an embodiment, a system receives a series of image data from a camera. This camera may comprise a color camera (such as red-green-blue or RGB), a depth camera, and a three-dimensional (3D) camera. This data may comprise separate depth and color images, a combined image that incorporates depth and color information, or a parsed image where objects are identified, such as people that are skeletal mapped. This data captures motions or poses made by at least one user. Based on this image data, the recognizer engine is able to parse gestures that the user intends to convey. The recognizer engine detects that the likelihood that the user has conveyed a gesture, and that the user has satisfied any parameters, either default or application-determined, associated with the gesture for the application. The recognizer engine then sends the confidence level that this has occurred to the application. In sending this confidence level, the recognizer engine may also send the application specifics of how the user conveyed the gesture for further processing by the application.

The data is further sent to a gesture tool. The gesture tool displays a visual representation of the data. In an embodiment, this visual representation comprises a list of those gesture filters used by the application, a list of parameters of a selected gesture filter of the list, a graph of each output of the selected gesture filter over time, and the image data from the camera and a corresponding skeletal map. In response to an adjustment of a value of a parameter via the visual representation, that adjustment is sent to the application where the gesture filter is correspondingly adjusted. That adjusted filter is then evaluated by the recognizer engine, and reflected in any outputs displayed by the gesture tool.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for a gesture tool in accordance with this specification are further described with reference to the accompanying drawings in which:

FIGS. 6A, 6B, 6C, 6D, and 6E illustrate an example gesture that a user 502 may make to signal for a "fair catch" in football video game.

DETAILED DESCRIPTION OF ILLUSTRATIVE EMBODIMENTS

As will be described herein, a user may control an application executing on a computing environment such as a game console, a computer, or the like by performing one or more gestures. According to one embodiment, the gestures may be received by, for example, a capture device. For example, the capture device may capture a depth image of a scene. In one embodiment, the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a skeletal model associated therewith. The skeletal model may then be provided to the computing environment such that the computing environment may track the skeletal model, render an avatar associated with the skeletal model, and may determine which controls to perform in an application executing on the computer environment based on, for example, gestures of the user that have been recognized from the skeletal model. A gesture recognizer engine, the architecture of which is described more fully below, is used to determine when a particular gesture has been made by the user.

Figure 1A:
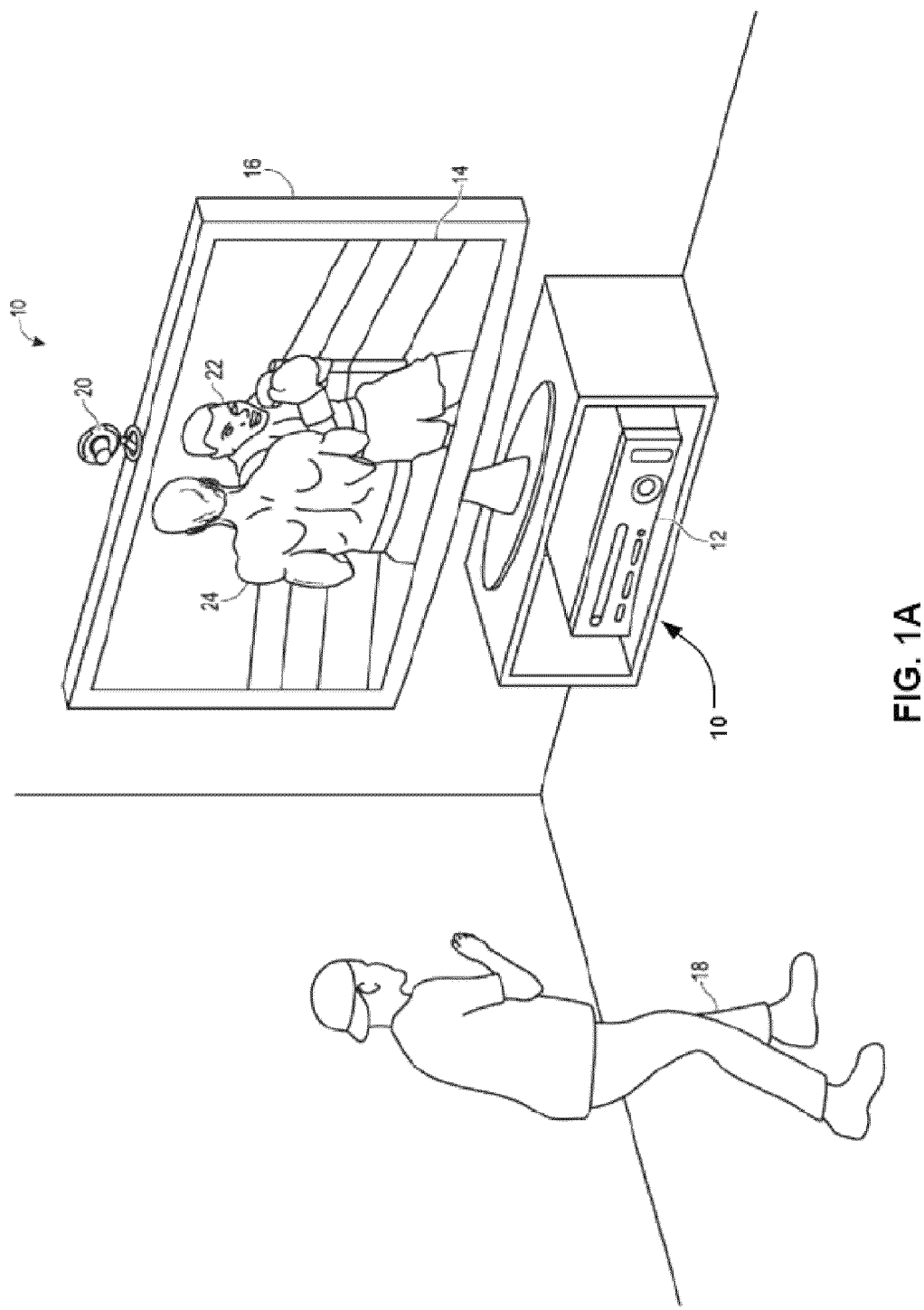
FIGS. 1A and 1B illustrate an example embodiment of a target recognition, analysis, and tracking system with a user playing a game.
Figure 1B:
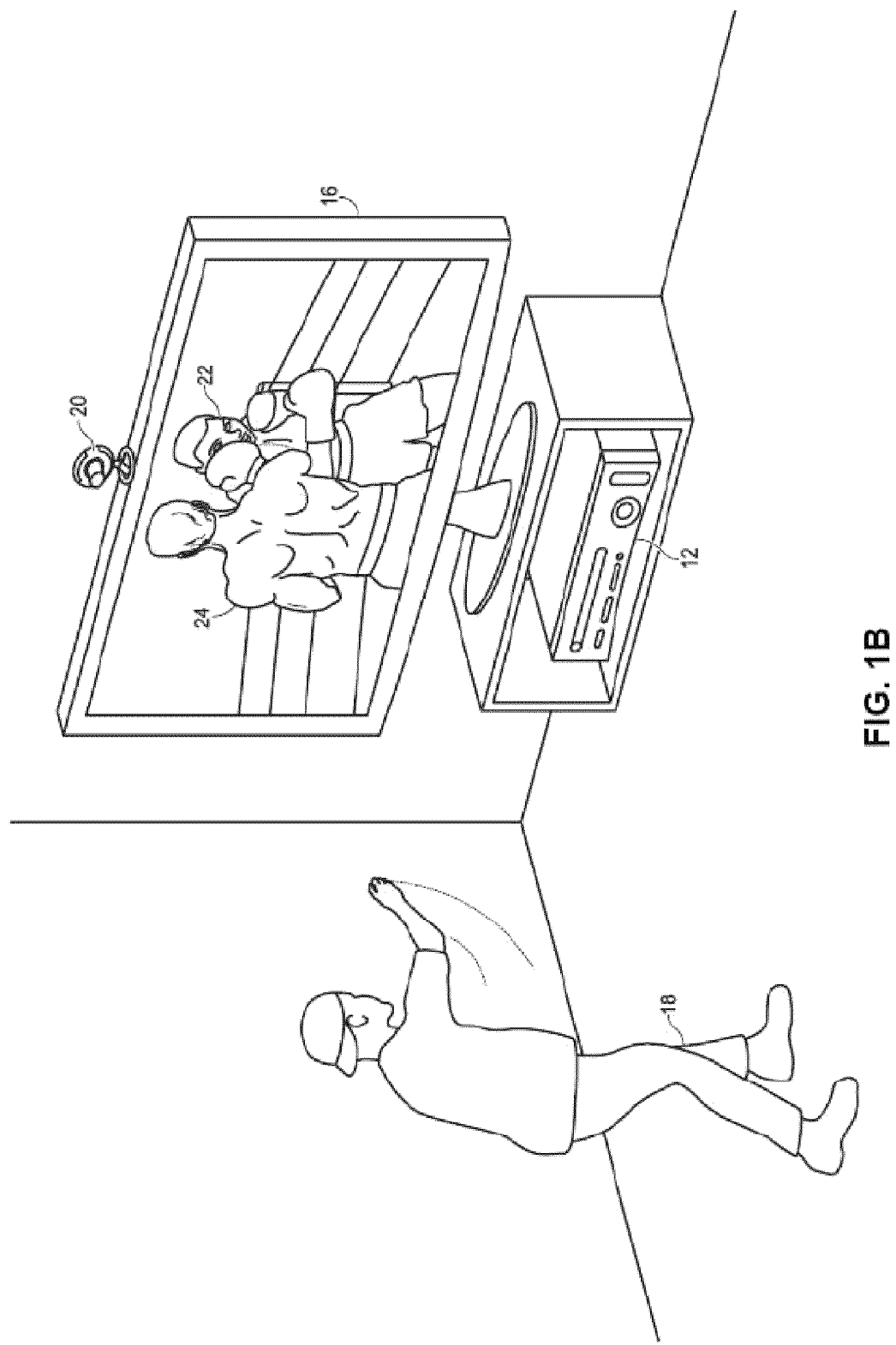

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
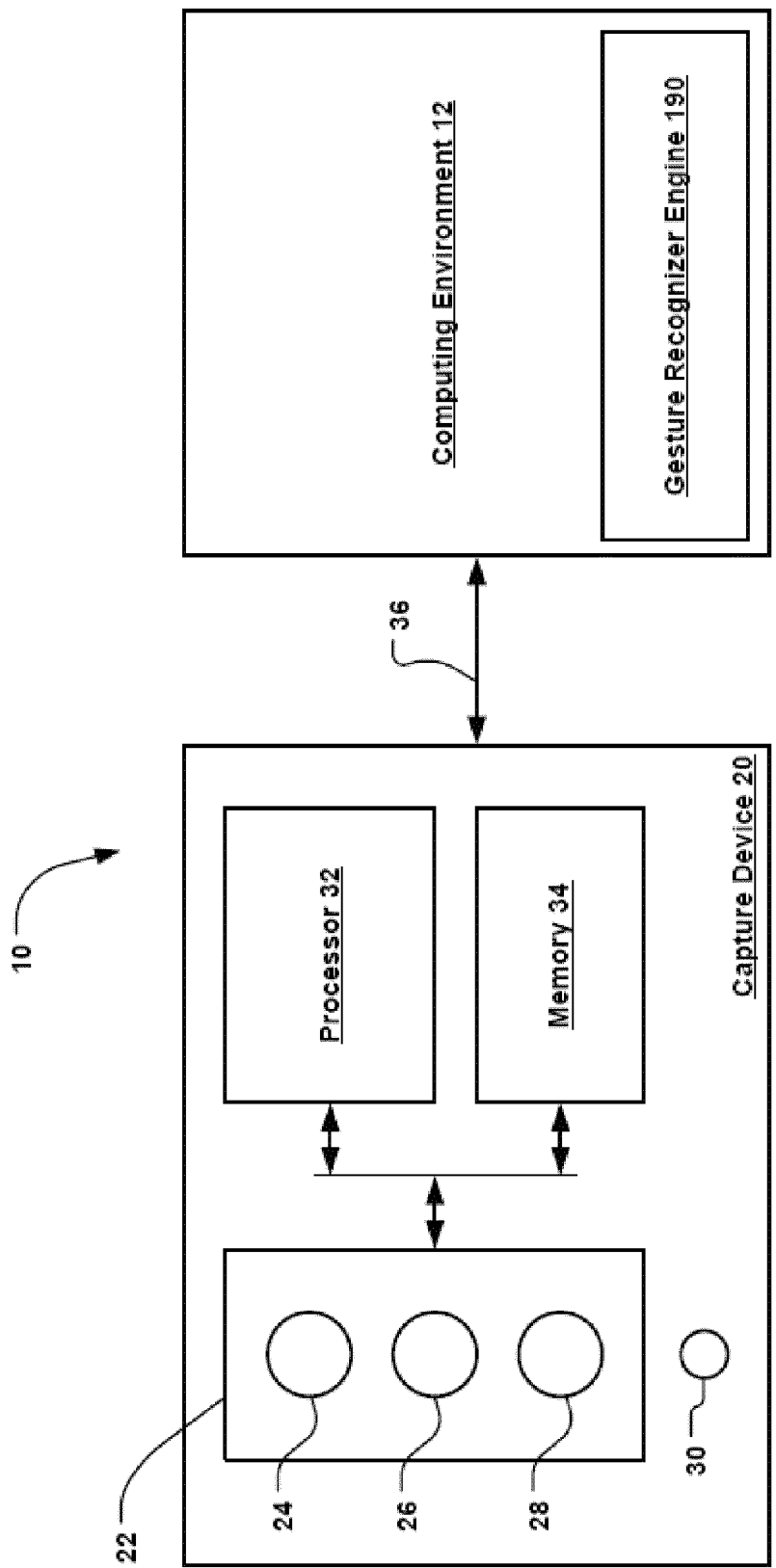
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, recognize user gestures and in response control an application such as a game or word processor. For example, as shown, in FIG. 2, the computing environment 12 may include a gestures recognizer engine 190. The gestures recognizer engine 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognizer engine 190 to identify when a user (as represented by the skeletal model) has performed one or more gestures. Those gestures may be associated with various controls of an application. Thus, the computing environment 12 may use the gesture recognizer engine 190 to interpret movements of the skeletal model and to control an application based on the movements.

Figure 3A:
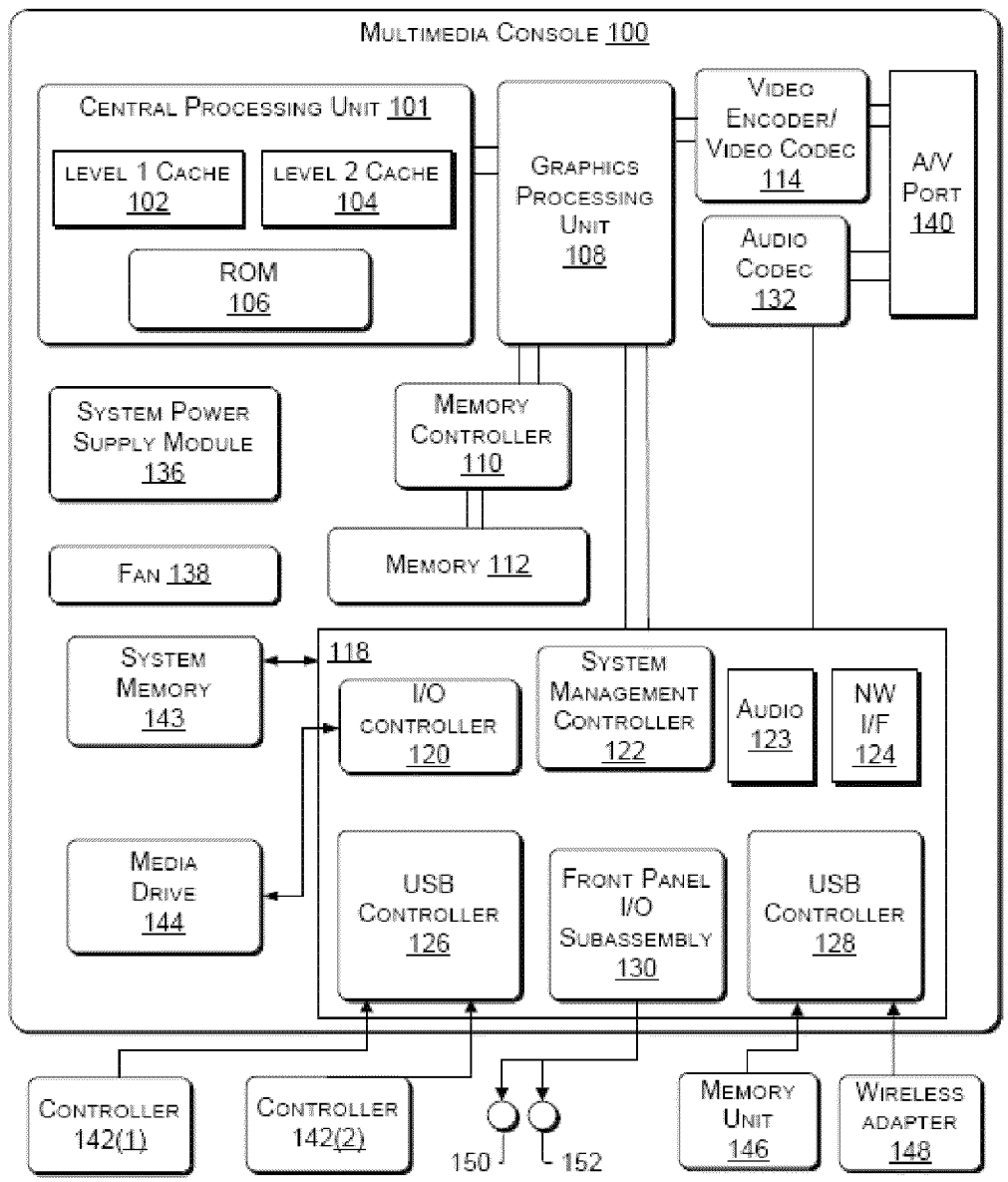
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 3B:
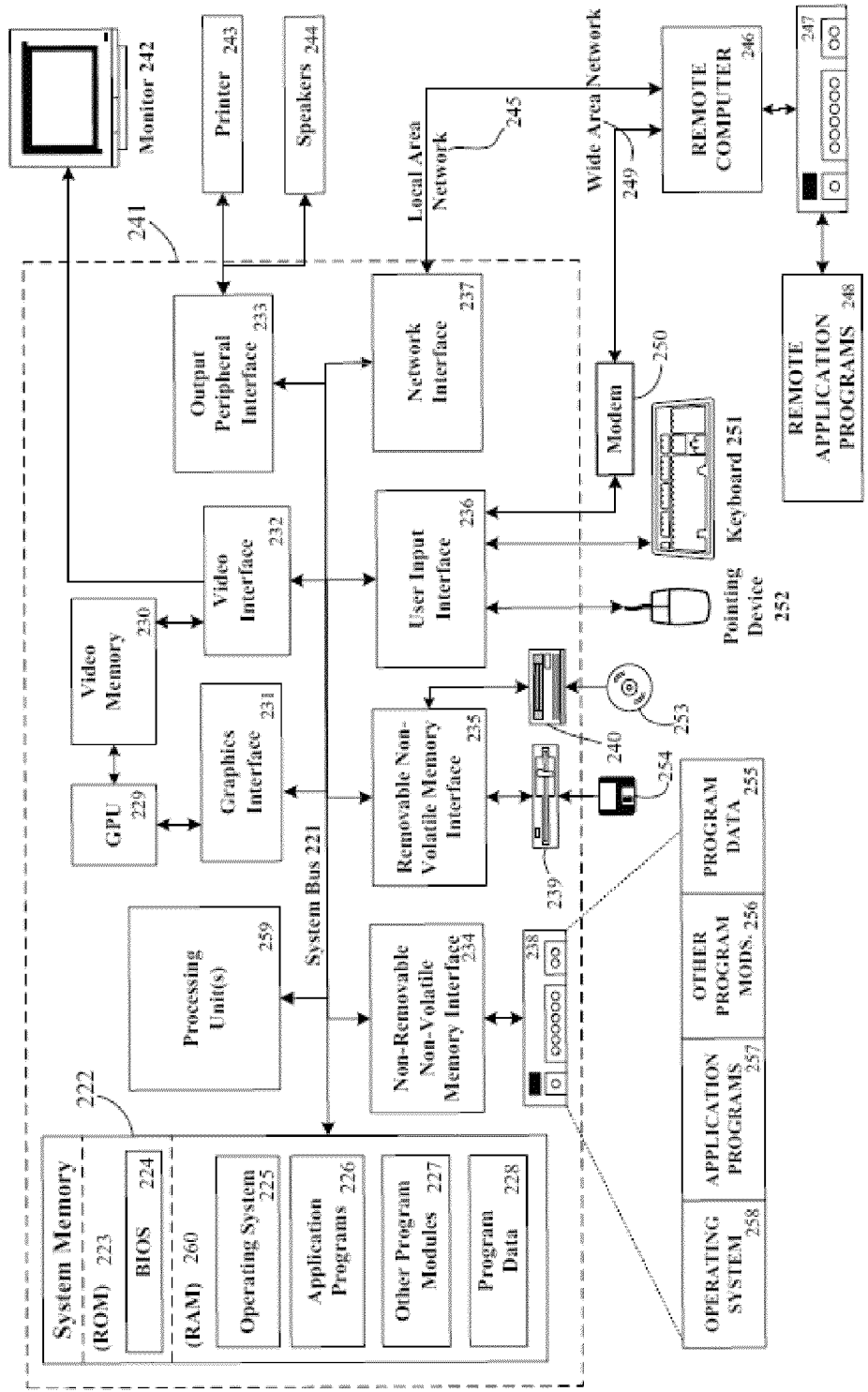
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4A:
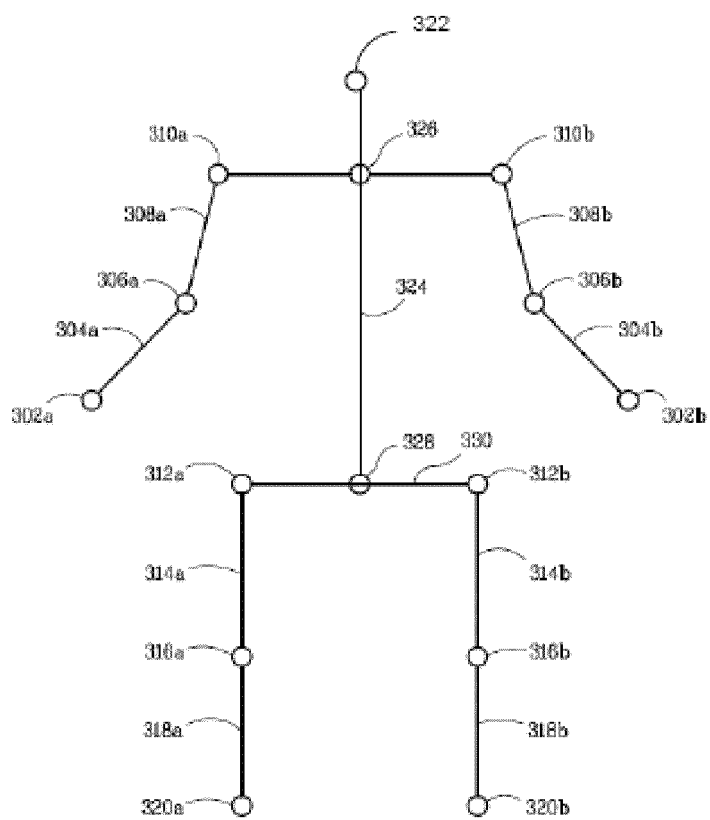
FIG. 4A illustrates a skeletal mapping of a user that has been generated from the target recognition, analysis, and tracking system of FIG. 2.

FIG. 4A depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and bottom 328 of the spine, and the waist 330. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 304 in front of his torso 324. A gesture may also incorporate props, such as by swinging a mock sword. A gesture may comprise more than one body part, such as clapping the hands 302 together, or a subtler motion, such as pursing one's lips.

Gestures may be used for input in a general computing context. For instance, various motions of the hands 302 or other body parts may correspond to common system wide tasks such as navigate up or down in a hierarchical list, open a file, close a file, and save a file. Gestures may also be used in a video-game-specific context, depending on the game. For instance, with a driving game, various motions of the hands 302 and feet 320 may correspond to steering a vehicle in a direction, shifting gears, accelerating, and breaking.

A user may generate a gesture that corresponds to walking or running, by walking or running in place himself The user may alternately lift and drop each leg 312-320 to mimic walking without moving. The system may parse this gesture by analyzing each hip 312 and each thigh 314. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 320 leave the ground entirely. The system may parse the skeleton for this gesture by analyzing the angle relation of the shoulders 310, hips 312 and knees 316 to see if they are in a position of alignment equal to standing up straight. Then these points and upper 326 and lower 328 spine points may be monitored for any upward acceleration. A sufficient combination of acceleration may trigger a jump gesture.

Given this "heel lift jump" gesture, an application may set values for parameters associated with this gesture. The parameters may include the above acceleration threshold, which determines how fast some combination of the user's shoulders 310, hips 312 and knees 316 must move upward to trigger the gesture, as well as a maximum angle of alignment between the shoulders 310, hips 312 and knees 316 at which a jump may still be triggered.

The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience. Where a gesture recognizer system is too sensitive, and even a slight forward motion of the hand 302 is interpreted as a throw, the user may become frustrated because gestures are being recognized where he has no intent to make a gesture, and thus, he lacks control over the system. Where a gesture recognizer system is not sensitive enough, the system may not recognize conscious attempts by the user to make a throwing gesture, frustrating him in a similar manner. At either end of the sensitivity spectrum, the user becomes frustrated because he cannot properly provide input to the system.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 302-310 to full length while making the grab gesture. In this situation, a similar grab gesture where the user only partially extends his arm 302-310 may not achieve the result of interacting with the ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 310a, and on the same side of the head 322 as the throwing arm 302a-310a. It may not be necessary to define all bounds of a volume, such as with this throwing gesture, where an outer bound away from the body is left undefined, and the volume extends out indefinitely, or to the edge of scene that is being monitored.

Figure 4B:
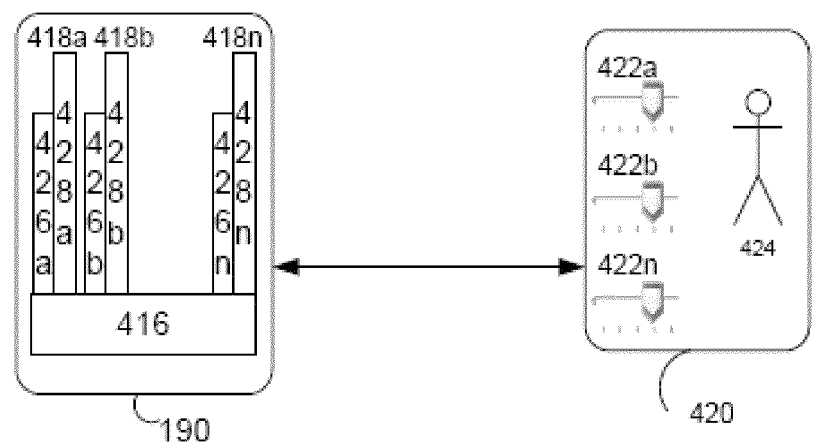
FIG. 4B illustrates further details of the gesture recognizer architecture shown in FIG. 2.

FIG. 4B provides further details of one exemplary embodiment of the gesture recognizer engine 190 of FIG. 2. As shown, the gesture recognizer engine 190 may comprise at least one filter 418 to determine a gesture or gestures. A filter 418 comprises information defining a gesture 426 (hereinafter referred to as a "gesture") along with parameters 428, or metadata, for that gesture. For instance, a throw, which comprises motion of one of the hands from behind the rear of the body to past the front of the body, may be implemented as a gesture 426 comprising information representing the movement of one of the hands of the user from behind the rear of the body to past the front of the body, as that movement would be captured by the depth camera. Parameters 428 may then be set for that gesture 426. Where the gesture 426 is a throw, a parameter 428 may be a threshold velocity that the hand has to reach, a distance the hand must travel (either absolute, or relative to the size of the user as a whole), and a confidence rating by the recognizer engine that the gesture occurred. These parameters 428 for the gesture 426 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 190 may have a base recognizer engine 416 that provides functionality to a gesture filter 418. In an embodiment, the functionality that the recognizer engine 416 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 418 are loaded and implemented on top of the base recognizer engine 416 and can utilize services provided by the engine 416 to all filters 418. In an embodiment, the base recognizer engine 416 processes received data to determine whether it meets the requirements of any filter 418. Since these provided services, such as parsing the input, are provided once by the base recognizer engine 416 rather than by each filter 418, such a service need only be processed once in a period of time as opposed to once per filter 418 for that period, so the processing required to determine gestures is reduced.

An application may use the filters 418 provided by the recognizer engine 190, or it may provide its own filter 418, which plugs in to the base recognizer engine 416. In an embodiment, all filters 418 have a common interface to enable this plug-in characteristic. Further, all filters 418 may utilize parameters 428, so a single gesture tool as described below may be used to debug and tune the entire filter system 418.

These parameters 428 may be tuned for an application or a context of an application by a gesture tool 420. In an embodiment, the gesture tool 420 comprises a plurality of sliders 422, each slider 422 corresponding to a parameter 428, as well as a pictoral representation of a body 424. As a parameter 428 is adjusted with a corresponding slider 422, the body 424 may demonstrate both actions that would be recognized as the gesture with those parameters 428 and actions that would not be recognized as the gesture with those parameters 428, identified as such. This visualization of the parameters 428 of gestures provides an effective means to both debug and fine tune a gesture.

FIG. 5 depicts more complex gestures or filters 418 created from stacked gestures or filters 418. Gestures can stack on each other. That is, more than one gesture may be expressed by a user at a single time. For instance, rather than disallowing any input but a throw when a throwing gesture is made, or requiring that a user remain motionless save for the components of the gesture (e.g. stand still while making a throwing gesture that involves only one arm). Where gestures stack, a user may make a jumping gesture and a throwing gesture simultaneously, and both of these gestures will be recognized by the gesture engine.

Figure 5A:
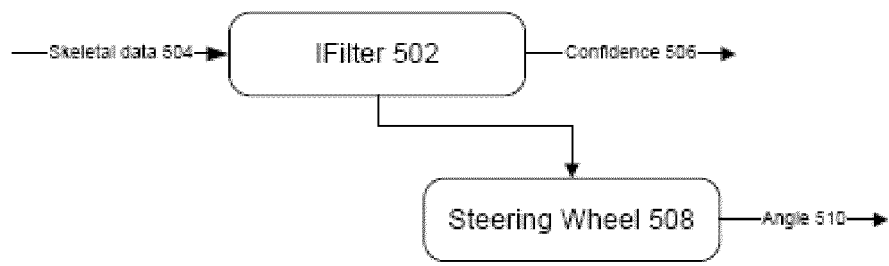
FIGS. 5A and 5B illustrate how gesture filters may be stacked to create more complex gesture filters.

FIG. 5A depicts a simple gesture filter 418 according to the stacking paradigm. The IFilter filter 502 is a basic filter 418 that may be used in every gesture filter. IFilter 502 takes user position data 504 and outputs a confidence level 506 that a gesture has occurred. It also feeds that position data 504 into a SteeringWheel filter 508 that takes it as an input and outputs an angle to which the user is steering (e.g. 40 degrees to the right of the user's current bearing) 510.

Figure 5B:
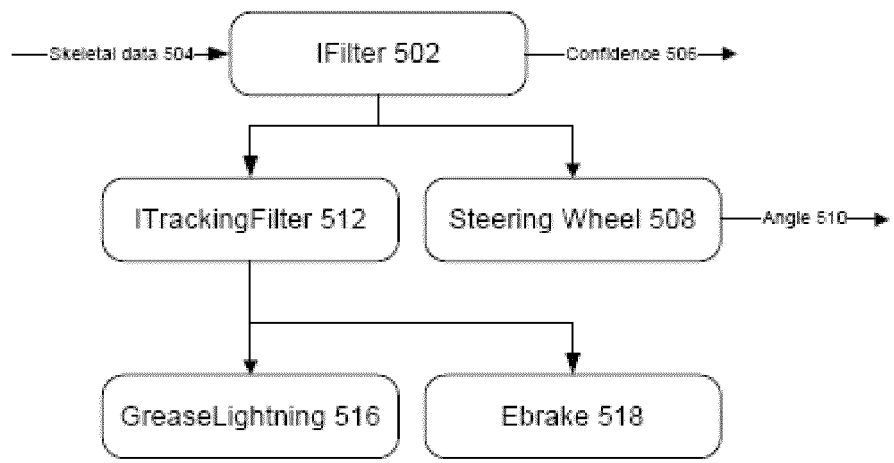

FIG. 5B depicts a more complex gesture that stacks filters 418 onto the gesture filter of FIG. 5A. In addition to IFilter 502 and SteeringWheel 508, there is an ITracking filter 512 that receives position data 504 from IFilter 502 and outputs the amount of progress the user has made through a gesture 514. ITracking 512 also feeds position data 504 to GreaseLightning 516 and EBrake 518, which are filters 418 regarding other gestures that may be made in operating a vehicle, such as using the emergency brake.

FIG. 6 depicts an example gesture that a user 602 may make to signal for a "fair catch" in a football video game. These figures depict the user at points in time, with FIG. 6A being the first point in time, and FIG. 6E being the last point in time. Each of these figures may correspond to a snapshot or frame of image data as captured by a depth camera 402, though not necessarily consecutive frames of image data, as the depth camera 402 may be able to capture frames more rapidly than the user may cover the distance. For instance, this gesture may occur over a period of 3 seconds, and where a depth camera captures data at 40 frames per second, it would capture 60 frames of image data while the user 602 made this fair catch gesture.

In FIG. 6A, the user 602 begins with his arms 604 down at his sides. He then raises them up and above his shoulders as depicted in FIG. 6B and then further up, to the approximate level of his head, as depicted in FIG. 6C. From there, he lowers his arms 604 to shoulder level, as depicted in FIG. 6D, and then again raises them up, to the approximate level of his head, as depicted in FIG. 6E. Where a system captures these positions by the user 602 without any intervening position that may signal that the gesture is cancelled, or another gesture is being made, it may have the fair catch gesture filter output a high confidence level that the user 602 made the fair catch gesture.

FIG. 7 depicts the example "fair catch" gesture of FIG. 5 as each frame of image data has been parsed to produce a skeletal map of the user. The system, having produced a skeletal map from the depth image of the user, may now determine how that user's body moves over time, and from that, parse the gesture.

Figures 7A, 7B, 7C, 7D, 7E:
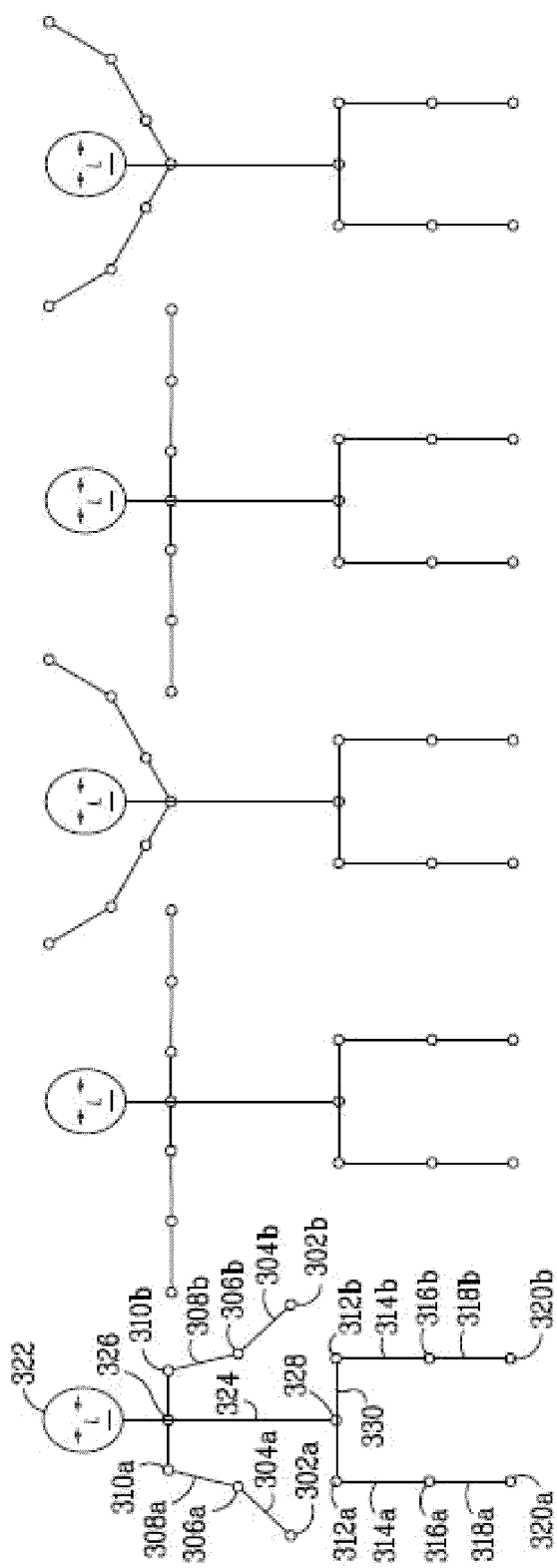
FIGS. 7A, 7B, 7C, 7D, and 7E illustrate the example "fair catch" gesture of FIGS. 6A, 6B, 6C, 6D, and 6E as each frame of image data has been parsed to produce a skeletal map of the user.

In FIG. 7A, the user's shoulders 310, are above his elbows 306, which in turn are above his hands 302. The shoulders 310, elbows 306 and hands 302 are then at a uniform level in FIG. 7B. The system then detects in FIG. 7C that the hands 302 are above the elbows, which are above the shoulders 310. In FIG. 7D, the user has returned to the position of FIG. 7B, where the shoulders 310, elbows 306 and hands 302 are at a uniform level. In the final position of the gesture, shown in FIG. 7E, the user returns to the position of FIG. 7C, where the hands 302 are above the elbows, which are above the shoulders 310.

While the capture device 20 captures a series of still images, such that in any one image the user appears to be stationary, the user is moving in the course of performing this gesture (as opposed to a stationary gesture, as discussed supra). The system is able to take this series of poses in each still image, and from that determine the confidence level of the moving gesture that the user is making.

In performing the gesture, a user is unlikely to be able to create an angle as formed by his right shoulder 310a, right elbow 306a and right hand 302a of, for example, between 140° and 145°. So, the application using the filter 418 for the fair catch gesture 426 may tune the associated parameters 428 to best serve the specifics of the application. For instance, the positions in FIGS. 7C and 7E may be recognized any time the user has his hands 302 above his shoulders 310, without regard to elbow 306 position. A set of parameters that are more strict may require that the hands 302 be above the head 310 and that the elbows 306 be both above the shoulders 310 and between the head 322 and the hands 302. Additionally, the parameters 428 for a fair catch gesture 426 may require that the user move from the position of FIG. 7A through the position of FIG. 7E within a specified period of time, such as 1.5 seconds, and if the user takes more than 1.5 seconds to move through these positions, it will not be recognized as the fair catch 418, and a very low confidence level may be output.

Figure 8:
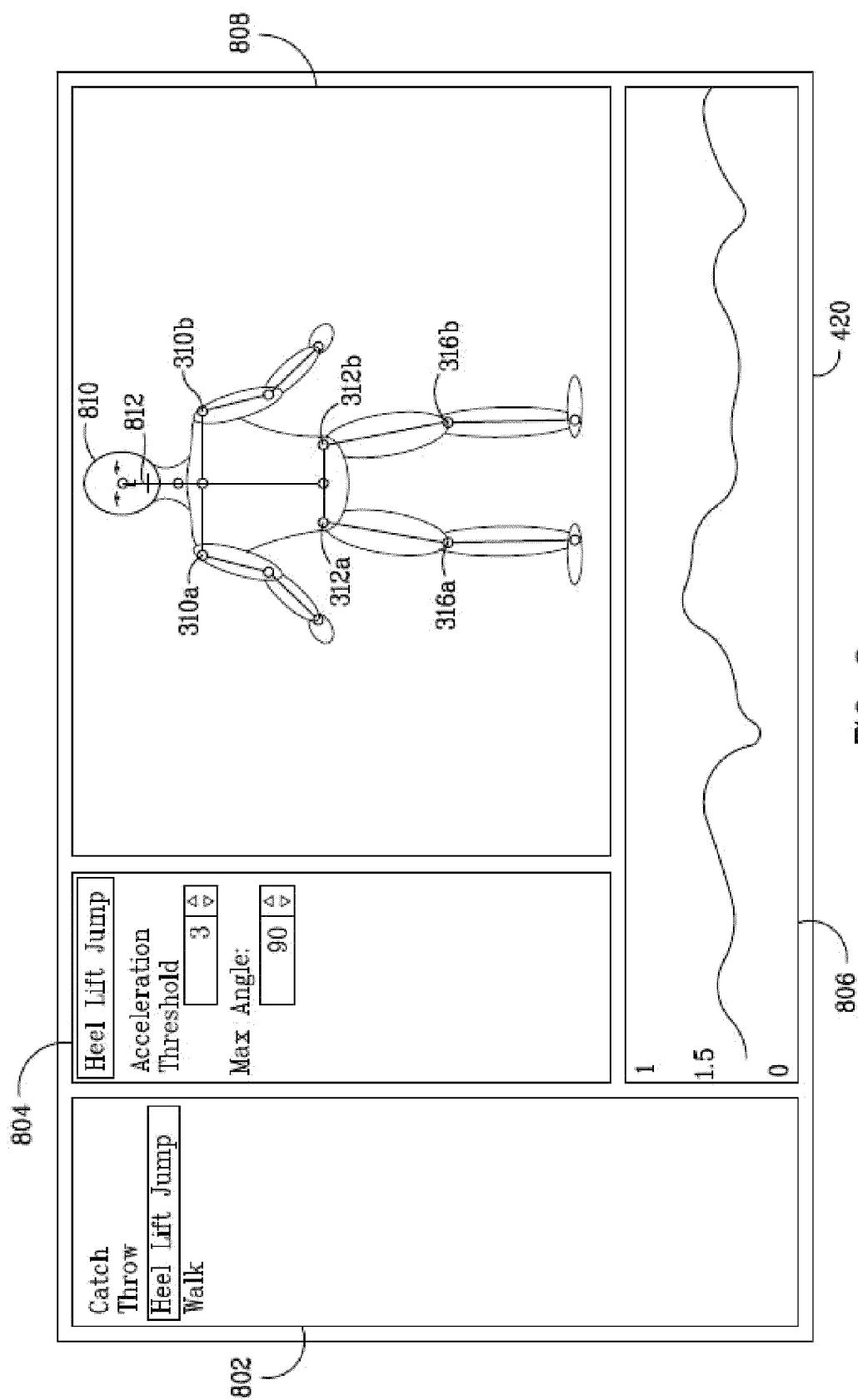
FIG. 8 illustrates further details of the gesture tool shown in FIG. 4B.

FIG. 8 illustrates an exemplary embodiment of the gesture tool 420 shown in FIG. 4B.

Developing applications designed for gesture control may be cumbersome. To properly debug such an application, some portion of the screen must usually be reserved for visualization of the data captured by the capture device, such as by a picture-in-picture display. This consumes vital screen real estate as well as computation time and resources from the application.

The gesture tool, when running on a separate computing device, may off-load burden of visualizing camera input from the computing device executing the application. The gesture tool also permits the rapid run-time iteration required for efficient gesture tuning. The gesture tool further provides a capability for recording and playing back data captured by the capture device for "off-line" gesture debugging. The gesture tool also provides a common language for all gesture-monitoring filters, which promotes modularity and the reuse of gesture filters between applications.

In an embodiment, a list of filters 418 processed by the recognizer engine 190 for an application is displayed in area 802. Additionally, image data is displayed in area 808. In an embodiment, this image data comprises color image data of a user 18 captured by capture device 20 overlaid with a skeletal map 812 of that user, generated from that color image data.

In response to selection of a gesture filter listed in area 802, details for parameters of that gesture filter are listed in area 804, along with user interface elements that allow those parameters to be adjusted. For instance, where the "heel lift jump" gesture filter is selected in area 802, area 804 displays the "acceleration threshold" and "maximum angle" parameters for that filter. The acceleration threshold parameter determines how fast some combination of the user's shoulders 310, hips 312 and knees 316 must move upward to trigger the gesture. The maximum angle parameter comprises the maximum angle of alignment between the shoulders 310, hips 312 and knees 316 at which a jump may still be triggered. In response to input to adjust a parameter, that information is sent to gesture recognizer engine 190, where the parameter is adjusted. That is, the value for that parameter in the particular gesture filter is modified to the new value entered with the gesture tool. This gesture filter with an adjusted parameter is then evaluated by the gesture recognizer engine and information about that is sent back to the gesture tool 420 as before.

In an embodiment, those parts of the skeletal mapping that are used in evaluating a gesture filter are highlighted. For instance, where the gesture tool is focused on the "heel lift gesture," the user's shoulders 310, hips 312 and knees 316 may be highlighted in the skeleton map. In an embodiment, this comprises displaying those portions of the skeleton map in a different color than the rest of the skeleton map. In an embodiment, this comprises encircling or otherwise setting off those portions of the skeleton map from the rest of the skeleton map.

In an embodiment, area 806 displays a graph of at least one output of the selected gesture filter over time. In an embodiment where the selected gesture filter has multiple outputs, such as a confidence level and an acceleration, each output may be graphed, and set off, such as with a different color, or different style of line (e.g. solid, dotted, dashed).

Figure 9A:
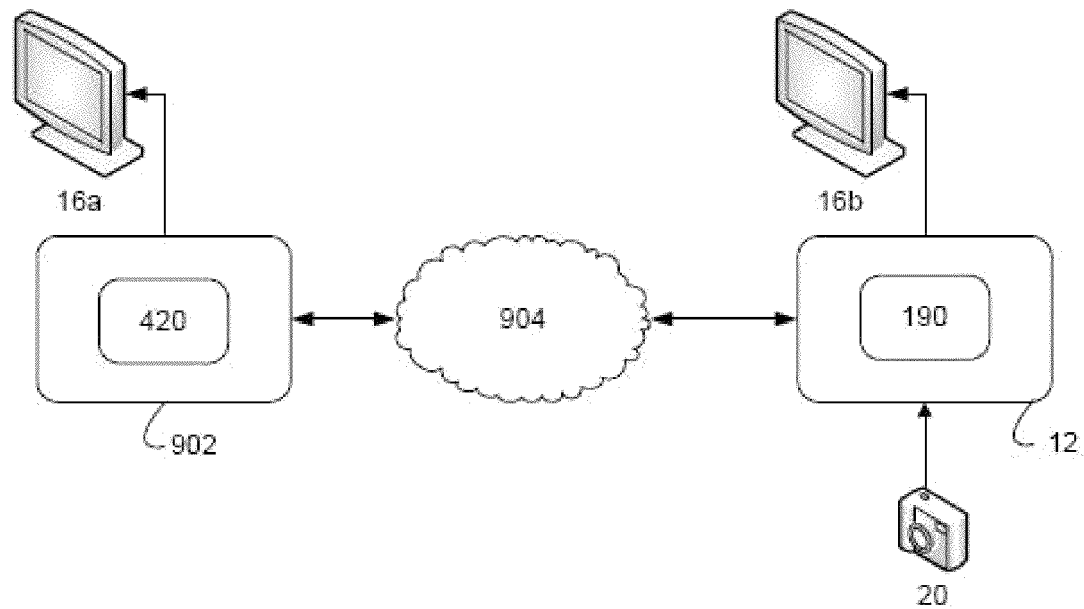
FIG. 9A illustrates an example architecture of a gesture tool operating in conjunction with an application.

FIG. 9A illustrates an example architecture of a gesture tool operating in conjunction with an application. In this exemplary architecture, gesture tool 420 is executed on computing environment 902 and communicates with gesture recognizer engine 190, which is executed on computing environment 12, across communications network 904. Computing environment 12 communicates with capture device 20. The gesture tool display is displayed on display device 16a, and the visual output of an application executing on computing environment 12 is displayed on display device 16b. In another embodiment, both the visual output of gesture tool 420 and an application executing on computing environment 12 are displayed on the same display device 16.

In an embodiment, the gesture tool and the application communicate through a gesture tool conduit, which may be a self-contained library of code. An application may be developed with the gesture tool conduit, and as a result, accept communications requests from the gesture tool, and then send and receive data from the gesture tool.

In an embodiment, the gesture tool conduit provides a simple interface for communication that allows an application to send images representing the most recent color, depth, and infrared (IR) images received from the capture device.

The gesture tool may display this data using a variety of visualizers from which a user of the gesture tool may select. In addition, the gesture tool conduit may provide a means for the application to add connotations to these images in the form of points, lines, geometric shapes, text, or other markers. These connotations may be displayed by the gesture tool, providing the user of the gesture tool with a self-contained view into the capture device data, with application-defined information overlays.

Additionally, the gesture tool conduit may provide a simple interface with which to register application variables with the gesture tool, such that the gesture tool can then display ad-hoc user interface elements to monitor and edit these values on the fly. In this way, the gesture tool may serve as an application-defined gesture filter monitoring and tuning apparatus, taking on those properties determined by the application itself. The gesture tuner may also automate the process of saving and loading snapshots of these application-defined gesture filter parameters, allowing a user of the gesture tool to edit those parameters and save the results for later use.

Figure 9B:
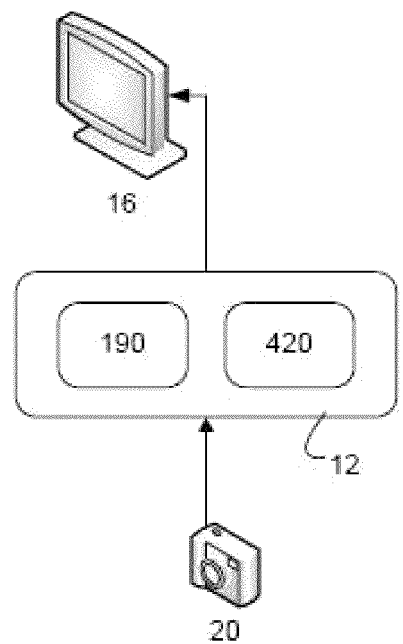
FIG. 9B illustrates another example architecture of a gesture tool operating in conjunction with an application.

FIG. 9B illustrates another example architecture of a gesture tool operating in conjunction with an application. In this exemplary architecture, both gesture tool 420 and gesture recognizer engine 190 execute on computing environment 12. Computing environment 12 communicates with capture device 20. The visual output of both the gesture tool 420 and an application executing on computing environment 12 that gesture tool is used to adjust are displayed on display device 16. In an embodiment, computing environment 12 sends visual output to a plurality of display devices 16, and the visual output of the gesture tool 420 is sent to a separate display device 16 than the visual output of the application.

Figure 10:
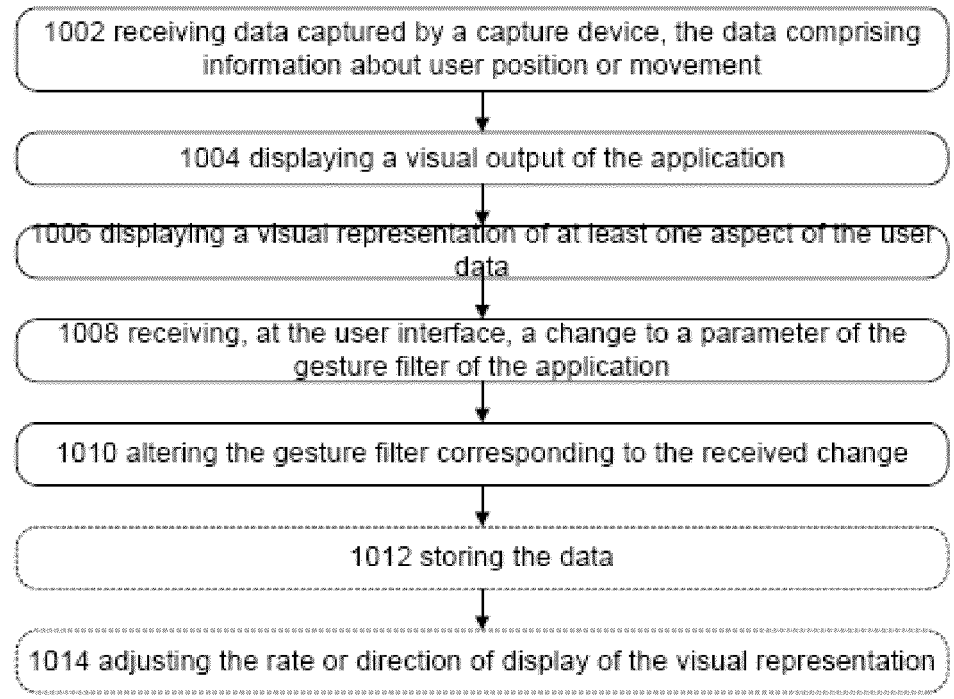
FIG. 10 illustrates exemplary operational procedures for a gesture tool.

FIG. 10 illustrates exemplary operational procedures for a gesture tool.

Operation 1002 depicts receiving data captured by a capture device, the data comprising information about user position or movement. The capture device may capture a scene that contains all of the user, such as from the floor to the ceiling and to the wall on each side of a room at the distance in which the user is located. The capture device may also capture a scene that contains only part of the user, such as the user from the abdomen up as he or she sits at a desk. The capture device may also capture an object controlled by the user, such as a prop camera that the user holds in his or her hand.

In an embodiment, the data is received as the capture device captures the data. In an embodiment, the data is received from a storage location where the data is stored as it is captured.

In an embodiment, the data comprises at least one of skeletal data, visible color data, infra-red color data, or depth data. In some embodiments, the data may comprise a combination of two or more of these types of data.

Operation 1004 depicts displaying a visual output of the application. This may comprise the visual output of the application as it would normally be displayed, were the gesture tool not present.

Operation 1006 depicts displaying a visual representation of at least one aspect of the user data. In an embodiment, this comprises displaying a list of gesture filters associated with the application. In an embodiment, this comprises displaying at least one parameter for a selected gesture filter, the selected gesture being drawn from the list of gesture filters. In an embodiment, at least one displayed parameter has an adjustable value, range of values, or upper or lower bound.

In an embodiment, this comprises displaying the data captured by the capture device. This may comprise displaying color data of the user. Alternatively, this may comprise displaying skeletal mapping data corresponding to the color data. Still further, this may comprise displaying a combination of different types of data. For example, both the color data and the skeletal map data may be displayed. One type of data may be overlaid with the other. For example, the skeletal map may be overlaid on the color data. In an embodiment, the parts of the skeletal map that correspond to the selected gesture filter are indicated, such as by being displayed with a different color than the rest of the skeletal map.

In an embodiment, displaying a visual representation comprises displaying a graph of at least one output of the gesture filter over time.

The visual representation and the visual output may be displayed on separate display devices. Alternatively, the visual representation and the visual output may be displayed on the same display device. In an embodiment, they are displayed on the same display device through picture-in-picture or a split screen.

Operation 1008 depicts receiving, at the user interface, a change to a parameter of the gesture filter of the application. This may occur, for example, where there is a text entry box associated with the parameter displayed in the visual representation, by receiving a new value in the text entry box Operation 1010 depicts altering the gesture filter corresponding to the received change. In an embodiment, this alteration is communicated to the gesture recognizer engine where it is then communicated to the application, processed by the application, stored, and altered at the gesture recognizer engine, so that successive data from the capture device will be evaluated with the altered gesture filter.

In an embodiment, the received change is received from the visual representation across a communications network.

Optional operation 1012 depicts storing the data captured by the capture device. The data may be stored for later evaluation of gesture filters against it. For instance, the data may comprise a prime example of a user performing a heel lift jump, such that the "heel lift jump" gesture filter should always output a high confidence level when evaluating this data no matter how the parameters are altered. This prime example may be stored so that whenever the "heel lift jump" gesture filter has an altered parameter, the stored data may be fun through the modified gesture filter to evaluate how well that modified filter "recognizes" the prime example of the heal lift jump.

Optional operation 1014 depicts adjusting the rate or direction of display of the visual representation. In an embodiment, this comprises reversing through the user data and its corresponding visual representation at normal, slow, or fast speed. In an embodiment, this comprises pausing the visual representation at a point in the data. In an embodiment, this comprises advancing through the data and its corresponding visual representation at a slower-than-normal speed. In an embodiment where the data is stored, or where the data has been previously rewound, this comprises advancing through the data and its corresponding visual representation at a fast speed.

Conclusion

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A computer system, comprising:
a processor;
a tool operable to execute on the processor to facilitate the adjustment of parameters of a gesture filter of an application that is designed to recognize whether a user of the application has performed a particular gesture from data comprising information about position or movement of the user, the tool operable to:
receive data captured by a capture device, the data comprising information representing user position or movement;
display a visual representation of the position or movement represented by the received data, the visual representation comprising a list identifying a gesture filter;
in response to user selection of the gesture filter from the list, display at least one adjustable parameter of the gesture filter;
in response to the system processing the data with the gesture filter and the adjustable parameter, display an indication of whether the position or movement represented by the data would be recognized by the gesture filter as the performance of the gesture that the gesture filter is designed to recognize;
receive, via a user interface of the display, a change to a parameter of the gesture filter of the application;
alter the gesture filter according to the received change; and
display an indication of whether processing the data with the gesture filter and the changed parameter causes the system to determine that the position or movement represented by the data would be recognized by the gesture filter as the performance of the gesture that the gesture filter is designed to recognize.

2. The system of claim 1, the tool further comprising capability to operate to:
receive the change from the visual representation across a communications network.

3. The system of claim 1, wherein the tool is operable to display a visual representation, the tool further comprising capability to operate to:
display a skeletal map associated with the data; and
in response to user selection of a gesture filter from the list, displaying an indication of at least one part of the skeletal map associated with the gesture filter.

4. The system of claim 1, wherein the tool is operable to display a visual representation the tool further comprising capability to operate to:
in response to user selection of a gesture filter from the list, display at least one output of the selected gesture filter.

5. The system of claim 1, wherein the tool further comprises capability to operate to display at least one output as a graph of a value of the output over time.

6. The system of claim 1, wherein each gesture filter of the list is operable to be specified by the application.

7. The system of claim 1, wherein the tool further comprises capability to operate to record the user data is, the tool further comprising capability to operate to:
adjust the rate or direction of display of the visual representation.

8. A method for altering visualized parameters for a gesture filter of an application, the gesture filter being designed to recognize whether to recognize a user of the application has performed a particular gesture from data comprising information about position or movement of the user, the method comprising:
receiving data captured by a capture device, the data comprising information about user position or movement;
displaying a visual output of the application;
displaying a visual representation of at least one aspect of the user data, the visual representation comprising a list comprising the gesture filter;
displaying a skeletal map associated with the user data;
in response to user selection of a gesture filter from the list, displaying an indication of at least one body part involved in the performance of the gesture that the gesture filter is designed to recognize;
in response to the system processing the data with the gesture filter and the adjustable parameter, displaying a representation indicating whether the position or movement represented by the data would be recognized by the gesture filter as the performance of the gesture that the gesture filter is designed to recognize;
receiving, via a user interface of the display, a change to a parameter of the gesture filter of the application;
altering the gesture filter corresponding to the received change; and
displaying a representation of whether processing the data with the gesture filter and the changed parameter causes the system to determine that the position or movement represented by the data would be recognized by the gesture filter as the performance of the gesture that the gesture filter is designed to recognize.

9. The method of claim 8, wherein the data is either received from the capture device as it is captured, or the data is received from a storage location where the data is stored as it is captured.

10. The method of claim 8, wherein the visual representation and the visual output are either displayed on a single display device or displayed on separate display devices.

11. The method of claim 10, wherein the visual representation and the visual output are displayed on a single display device through either a split-screen or picture-in-picture.

12. The method of claim 8, wherein the data comprises at least one from a set, the set comprising: skeletal data, visible color data, infra-red color data, and depth data.

13. The method of claim 8, wherein the captured data comprises color image data and depth data, and wherein the visual representation comprises an overlay of the color image data and skeletal mapping data derived at least in part from the depth data.

14. The method of claim 8, wherein the visual output comprises a list of a plurality of gesture filters of the application, further comprising:
in response to user selection of a selected gesture filter of the plurality of gesture filters, displaying the visual representation of at least one aspect of the user data, the visual representation corresponding to the selected gesture filter.

15. The method of claim 8, wherein the visual representation comprises a skeletal map of at least part of the user corresponding to the data, further comprising:
   displaying an indication in the visual representation of at least one part of the skeletal map that corresponds to a selected gesture filter.

16. The method of claim 8, further comprising:
   storing the data captured by the capture device.

17. The method of claim 8, wherein the visual representation comprises a value, a range of values, or a bound of the parameter.

18. A volatile or nonvolatile computer storage medium for altering visualized parameters for a gesture filter of an application bearing computer-readable instructions that, when executed on a processor, cause the processor to perform operations comprising:
   receiving data captured by a capture device, the data comprising information representing user position or movement;
   displaying a visual representation of the position or movement represented by the received data, the visual representation comprising a list comprising the gesture filter;
   in response to user selection of the gesture filter from the list, displaying at least one adjustable parameter of the gesture filter and an indication of at least one body part involved in the performance of the gesture that the gesture filter is designed to recognize;
   displaying a representation of whether the data invokes a computer-recognized input command that corresponds to the gesture filter in response to the system processing the data with the gesture filter and the adjustable parameter, based on the determination of the system;
   receiving, via a user interface of the display, a change to a parameter of the gesture filter of the application;
   altering the gesture filter according to the received change; and
   displaying a representation of whether processing the data with the gesture filter and the changed parameter causes the system to determine that the data invokes the gesture filter.

19. The computer-readable storage medium of claim 18, wherein displaying a visual representation of the position or movement represented by the received data comprises:
   in response to user selection of the gesture filter from the list, displaying at least one adjustable parameter of the gesture filter.

20. The computer-readable storage medium of claim 18, further bearing computer-readable instructions that, when executed on the processor, cause the processor to perform operations comprising:
   displaying a skeletal map associated with the data; and
   in response to user selection of a gesture filter from the list, displaying an indication of at least one part of the skeletal map associated with the gesture filter.

* * * * *